(12) United States Patent
Bentland et al.

(10) Patent No.: US 10,154,462 B2
(45) Date of Patent: Dec. 11, 2018

(54) RADIO LINK MANAGEMENT IN A COMBINED CELL

(71) Applicant: Telefonaktiebolaget LM Ericsson (publ), Stockholm (SE)

(72) Inventors: Benny Bentland, Lindome (SE); Anders Lamm, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/519,710

(22) PCT Filed: Dec. 12, 2014

(86) PCT No.: PCT/EP2014/077487
§ 371 (c)(1),
(2) Date: Jun. 16, 2016

(87) PCT Pub. No.: WO2016/091317
PCT Pub. Date: Jun. 16, 2016

(65) Prior Publication Data
US 2017/0257829 A1 Sep. 7, 2017

(51) Int. Cl.
*H04W 52/12* (2009.01)
*H04W 52/22* (2009.01)
(Continued)

(52) U.S. Cl.
CPC .......... *H04W 52/12* (2013.01); *H04B 17/318* (2015.01); *H04W 52/221* (2013.01);
(Continued)

(58) Field of Classification Search
None
See application file for complete search history.

(56) References Cited

U.S. PATENT DOCUMENTS

| | | | |
|---|---|---|---|
| 9,020,554 B2* | 4/2015 | Tee ............. | H04W 52/346 370/318 |
| 2004/0106371 A1* | 6/2004 | Agin ............. | H04W 52/267 455/1 |

(Continued)

OTHER PUBLICATIONS

Agrawal et al, "Iterative Power Control for Imperfect Successive Interference Cancellation" IEEE Transactions on Wireless Communications, vol. 4, No. 3, May 2005.*
(Continued)

*Primary Examiner* — Xavier Wong
(74) *Attorney, Agent, or Firm* — Coats & Bennett, PLLC (57) ABSTRACT

The present disclosure relates to a CDMA communication node arrangement comprising at least two spatially separated antenna units, at least one radio unit and at least one control unit. Each antenna unit has at least one corresponding coverage area and is connected to the central unit. The control unit is arranged to alter transmitting properties of at least a first antenna unit, to a user terminal, such that more or less power is transmitted by the first antenna unit in a dedicated channel. The control unit is arranged to monitor received inner power control loop commands when at least a second antenna unit is communicating with the user terminal, and to determine whether said first antenna unit should start or stop communicating with the user terminal, or continue as before, based on how the inner power control loop commands respond. The present disclosure also relates to a corresponding method.

32 Claims, 8 Drawing Sheets

(51) Int. Cl.
*H04W 52/54* (2009.01)
*H04W 52/24* (2009.01)
*H04B 17/318* (2015.01)
*H04W 52/38* (2009.01)
*H04W 52/40* (2009.01)
*H04B 17/373* (2015.01)

(52) U.S. Cl.
CPC ........... *H04W 52/24* (2013.01); *H04W 52/54* (2013.01); *H04B 17/373* (2015.01); *H04W 52/225* (2013.01); *H04W 52/386* (2013.01); *H04W 52/40* (2013.01)

(56) References Cited

U.S. PATENT DOCUMENTS

| | | | | |
|---|---|---|---|---|
| 2004/0266338 | A1* | 12/2004 | Rowitch | H04B 7/155 455/7 |
| 2008/0075178 | A1* | 3/2008 | Lappetelainen | H04B 7/155 375/260 |
| 2008/0176574 | A1* | 7/2008 | Okamoto | H04W 52/12 455/445 |
| 2008/0316950 | A1* | 12/2008 | Damnjanovic | H04W 52/146 370/311 |
| 2009/0310697 | A1* | 12/2009 | Yu | H04B 7/0434 375/267 |
| 2013/0143617 | A1* | 6/2013 | Cea | H04W 52/241 455/522 |
| 2013/0230008 | A1 | 9/2013 | Christoffersson et al. | |

OTHER PUBLICATIONS

Ericsson et al., "Analysis of Probing Pilots for Spatial Reuse Mode in Combined Cell Deployment", 3GPP TSG RAN WG1 Meeting #72bis, Apr. 15-19, 2013, pp. 1-9, Chicago, US, R1-131540.

Ericsson et al., "Overview of Combined Cell Deployment in Heterogeneous Networks", 3GPP TSG RAN WG1 Meeting #72, Jan. 28-Feb. 1, 2013, pp. 1-12, St. Julian's, Malta, R1-130610.

* cited by examiner

RADIO LINK MANAGEMENT IN A COMBINED CELL

TECHNICAL FIELD

The present disclosure relates to CDMA (Code Division Multiple Access) communication node arrangements comprising, at least two spatially separated antenna units, at least one radio unit and at least one central unit that in turn comprises a control unit. Each antenna unit has at least one corresponding coverage area and is connected to said central unit, and the coverage areas form a combined cell.

The present disclosure also relates to methods for controlling transmitted power to a user terminal in a CDMA (Code Division Multiple Access) communication system.

BACKGROUND

A WCDMA (Wideband Code Division Multiple Access) or CDMA (Code Division Multiple Access) combined cell comprises a number of cell portions, each cell portion having one or more antenna units for DL (Downlink) and UL (Uplink) radio links. The DL in all cell portions transmits the cell information and an individual CPICH (Common Pilot Channel) in each cell portion defines that cell portion's coverage, where the cell portions together form the cell and the cell coverage. The DL power relative to cell portion CPICH is the same in all portions. The DL channels towards one specific user terminal are transmitted in all cell portions independent of whether the user terminal can benefit from the signal or not. In UL, the RBS (Radio Base Station) periodically searches for the user terminal signal in all portions and receives the UL signal from the user terminal in portions where significant power is detected.

A problem in such a configuration with combined cells is that the RBS do not know whether a user terminal benefits from the DL power in a cell portion or not. There is no possibility for the user terminal to distinguish between signals received from different cell portions. The signals are experienced as multipath signals by the user terminal and there is one power control loop adjusting the received multipath DL power.

To effectively use available DL power and to mitigate inter/intra cell interference, it is advantageous if the DL to user terminal is transmitted only in the cell portions where the user terminal has a sufficient benefit of the provided power.

It is thus desirable to be able to detect if a user terminal can receive and benefit from a certain DL radio link in a certain cell portion to a relatively high extent of reliability.

SUMMARY

An object of the present disclosure is to provide means for detecting if a user terminal can receive and benefit from a certain DL radio link in a certain cell portion to a relatively high extent of reliability.

This object is achieved by means of a CDMA (Code Division Multiple Access) communication node arrangement comprising at least two spatially separated antenna units, at least one radio unit and at least one central unit that in turn comprises a control unit. Each antenna unit has at least one corresponding coverage area and is connected to said central unit, and the coverage areas form a combined cell. The control unit is arranged to alter transmitting properties of at least a first antenna unit, having at least a first coverage area, to a user terminal, such that either more or less power is transmitted by the first antenna unit in a dedicated channel by inserting transmit power alterations. The dedicated channel is arranged for inner power control loop commands and the control unit is arranged to monitor received inner power control loop commands when at least a second antenna unit having at least a second coverage area is communicating with the user terminal. The control unit is further arranged to determine whether said first antenna unit should start or stop communicating with the user terminal, or continue as before, based on how the result of the monitored inner power control loop commands responds to said transmitting properties alterations.

The present disclosure also relates to a method for controlling transmitted power to a user terminal in a CDMA (Code Division Multiple Access) communication system. The method comprises:

Altering transmitting properties of at least a first antenna unit to a user terminal such that either more or less power is transmitted by the first antenna unit in a dedicated channel by inserting transmit power alterations, where the dedicated channel is used for inner power control loop commands.

Monitoring received inner power control loop commands.

Determining whether said first antenna unit should start or stop communicating with the user terminal, or continue as before, based on how the result of the monitored inner power control loop commands responds to said transmitting properties alterations.

According to an example, the control unit is arranged to control said first antenna unit to alter its transmitting properties by inserting transmit power alterations according to a pre-determined pattern of power alterations.

According to another example, the inner power control loop commands are in the form of TPC (Transmit Power Control) commands.

According to another example, the user terminal is arranged to measure received power at the dedicated channel.

According to another example, the control unit is arranged to control said first antenna unit to alter its transmitting properties to the user terminal such that less power is transmitted to the user terminal than before the alteration, for example by inserting consecutive power drop periods towards the user terminal during communication with the user terminal.

According to another example, the control unit is arranged to control said first antenna unit to continue communicating with the user terminal in the same way as before the alteration if the results of the monitored inner power control loop commands fulfil certain criteria, otherwise stop communicating with the user terminal.

According to another example, the control unit is arranged to control said first antenna unit to alter its transmitting properties to the user terminal such that power is transmitted to the user terminal, the transmitted power towards the user terminal being shut-off before the alteration. This is for example done by inserting consecutive periods where power is transmitted towards the user terminal.

According to another example, control unit is arranged to control said first antenna unit to start communicating with the user terminal if the results of the monitored inner power control loop commands fulfil certain criteria, otherwise not start communicating with the user terminal.

In the above examples, said certain criteria may for example comprise whether the inner control loop commands take a certain value at least a predetermined number of times during a certain time period.

Other examples are evident from the dependent claims.

Mainly, the present disclosure makes it possible to detect if a DL radio link from a cell portion contributes to a user terminal's received signal power or not. This makes it possible to turn off DL signal power to the user terminal in portions where the power does not contribute, and to add DL signal power in cell portions where the power contributes.

A number of advantages are obtained by means of the present disclosure, for example:
  Works with legacy user terminals as well as with those that are state of the art. No need for dedicated pilots or similar.
  DL signal to a user terminal is only transmitted in cell portions where the user terminal benefits from the power.
  Minimizes inter/intra cell interference.
  Saved power in a cell portion may be used to improve signal quality to other user terminals in the cell portion.
  If a cell portion is confirmed not used for communication with a user terminal, its allocated codes may be reused for another user terminal in this cell portion.
  Enables establishment of a DL radio link in a cell portion first when utilized by a user terminal, which saves radio link resources in DL.

BRIEF DESCRIPTION OF THE DRAWINGS

The present disclosure will now be described more in detail with reference to the appended drawings, where.

DETAILED DESCRIPTION

Figure 1:
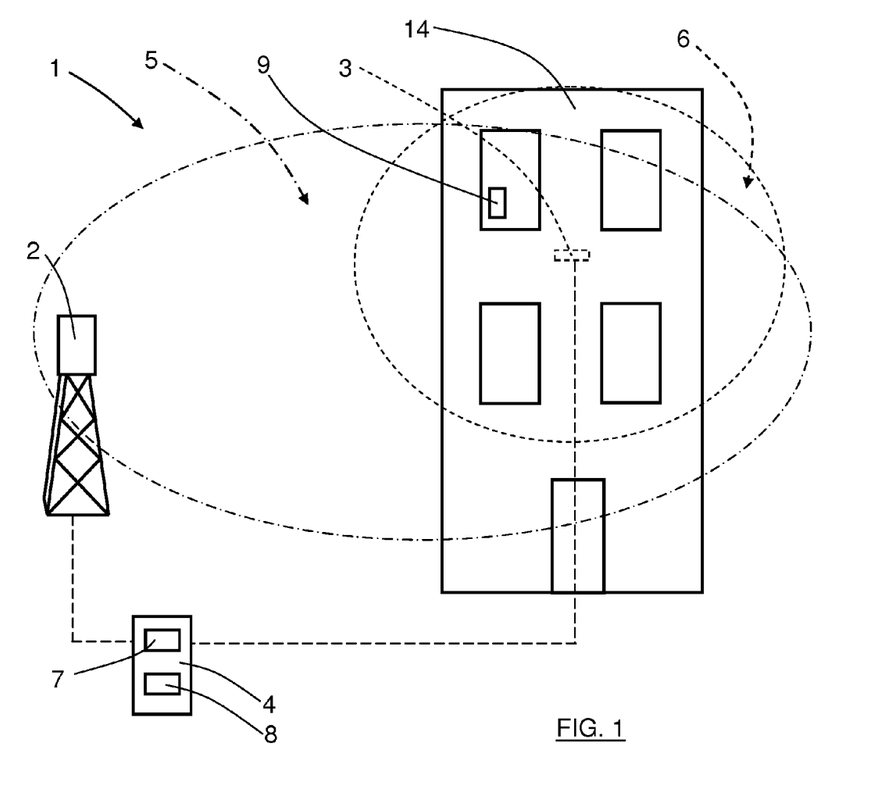
FIG. 1 shows a schematic side view of communication node arrangement.

With reference to FIG. 1, there is a WCDMA (Wideband Code Division Multiple Access) communication node arrangement 1 comprising a central unit 4, a first antenna unit 2 and a second antenna unit 3, where the antenna units 2, 3 are spatially separated. The first antenna unit 2 has a first coverage area 5 and the second antenna unit 3 has a second coverage area 6, where the coverage areas 5, 6 are constituted corresponding by cell portions and form a combined cell. In this context, a combined cell means that the same cell information is broadcasted via the antenna units 2, 3, and their coverage areas 5, 6 together constitute the total cell coverage area.

Figure 6:
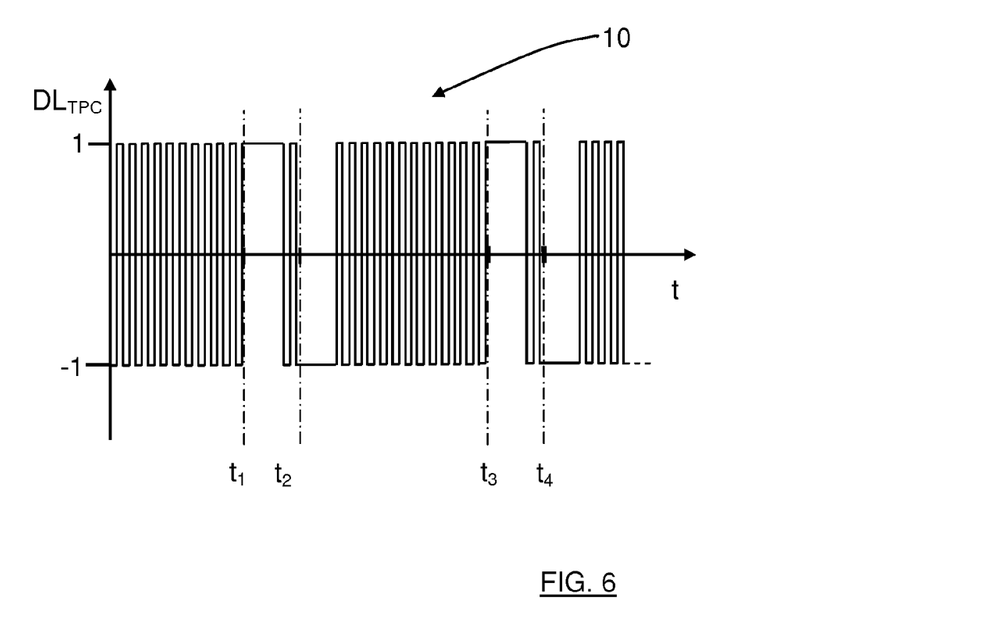
FIG. 6 shows how a TPC (Transmit Power Control) loop varies over time in the first example.
Figure 11:
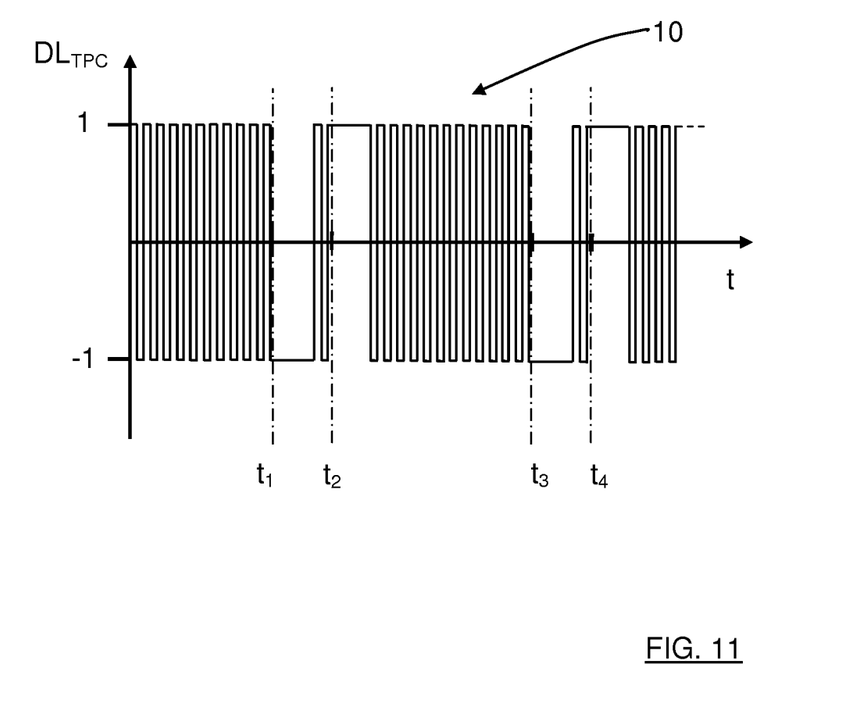
FIG. 11 shows how a TPC (Transmit Power Control) loop varies over time in the second example.

The antenna units 2, 3 are connected to the central unit 4, which central unit 4 comprises a radio unit 7 and a control unit 8. In this example, a user terminal 9 is inside a building 14, the first coverage area 5 is relatively large and covers the building 14 and its surroundings, and the second coverage area 6 is relatively small, and is mainly arranged to cover the upper part of the building 14. The user terminal 9 uses an inner power control loop that in this example is constituted by a TPC (Transmit Power Control) loop in the form of TPC commands 10 generated by the user terminal 9, as illustrated in FIG. 6 and FIG. 11. The TPC is either 1 or −1, where 1 means that the power should be raised and −1, means that the power should be lowered, and may be regarded as TPC UP/DOWN commands and is defined in the standard 3GPP TS 25.214. Since only these two conditions are available, a statistic mean value over a certain time period is used for decision. The power that is transmitted from the respective antenna units 2, 3 towards the user terminal 9 is the same relative their CPICH (Common Pilot Channel) power. Depending on where the user terminal 9 is positioned, the transmitted signals have experienced different degrees of attenuation when received at the user terminal 9.

For the situation in FIG. 1, different scenarios may occur when both the first antenna unit 2 and the second antenna unit 3 are communicating with the user terminal 9 at the same time. For example, the user terminal 9 may be moving into the building 14, or reside inside the building 14, then probably being best suited for communication via the second antenna unit 3, being well within the second coverage area 6 in the building 14. In that case, DL communication from the first antenna unit 2 to the user terminal is superfluous. Alternatively, the user terminal 9 may be moving out from the building 14, leaving the second coverage area 6. In that case, DL communication from the second antenna unit 2 to the user terminal is superfluous.

In the following, it will be described how to control the antenna units 2, 3 to avoid superfluous communication.

Figure 2:
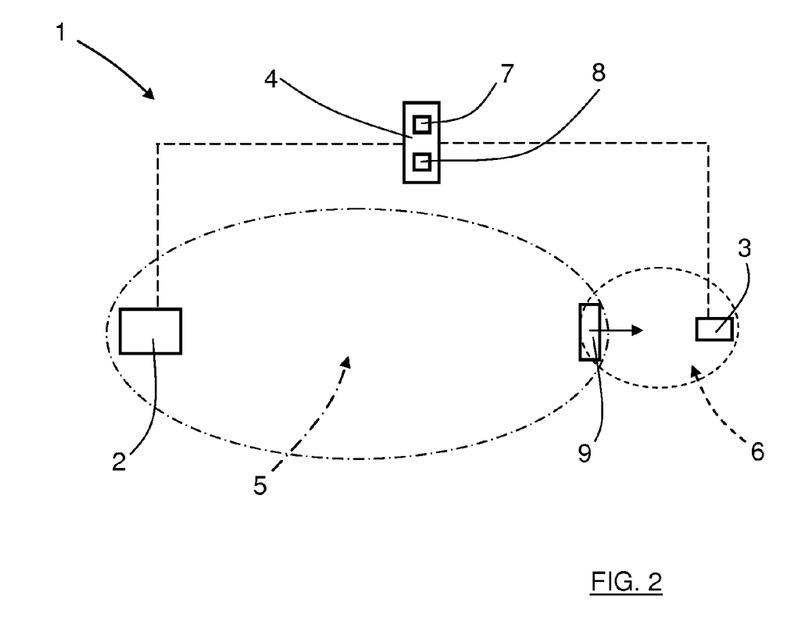
FIG. 2 shows a schematic top view of a first example of a communication node arrangement.

With reference to FIG. 2, showing a first example, both the first antenna unit 2 and the second antenna unit 3 are communicating with the user terminal 9 at the same time, and the user terminal 9 is moving from the first coverage area 5 to the second coverage area 6.

According to the present disclosure in general, the control unit 8 is arranged to alter transmitting properties of first antenna unit 2 to the user terminal 9 such that either more or less power is transmitted, and then it is determined to which degree this alteration of transmitting properties has affected the communication for the user terminal 9. All such alterations are performed via a dedicated channel, such as for example DCH (Dedicated transport Channel), A-DCH (Associated Dedicated transport Channel), or F-DPCH (Fractional Dedicated Physical Channel) where the dedicated channel is arranged for the TPC commands. Main communication is usually performed over a common channel HS (High Speed).

Figure 3:
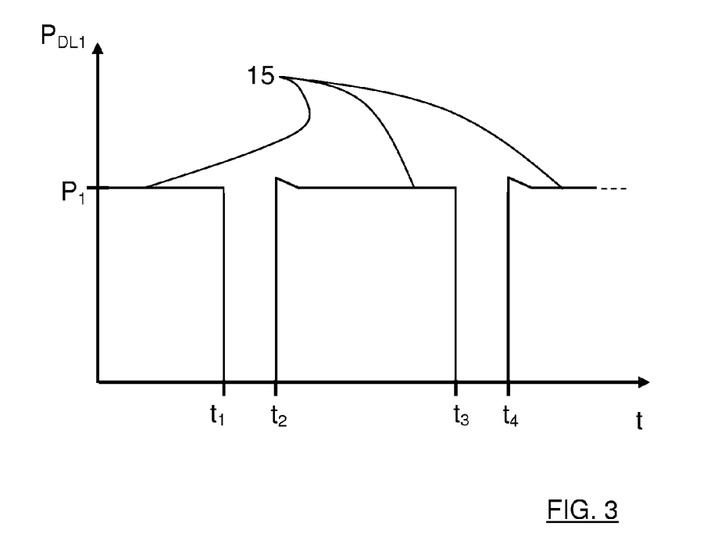
FIG. 3 shows how downlink power transmitted from a first antenna unit to a user terminal varies over time in the first example.

In this example, less power is transmitted as shown in FIG. 3. The control unit 8 is arranged to control said first antenna unit 2 to alter its transmitting properties by inserting consecutive power drop periods towards the user terminal 9 during communication with the user terminal 9. The user terminal 9 is arranged to measure received power at the dedicated channel, and to decide TPC UP/DOWN commands.

For this purpose, the control unit 8 is arranged to monitor the TPC commands 10 and to determine whether the first antenna unit 2 should stop communicating with the user terminal 9, based on how the result of the monitored TPC commands 10 responds to the transmitting properties alteration. In other words, a probing is performed to enable determining possible radio link deletion in a certain coverage area, probing in this context comprising altering transmitting properties of an first antenna unit to a user terminal in a dedicated channel such that either more or less power is transmitted, and monitoring possible impact at the TPC commands. After the probing, a decision is taken regarding whether communication should take place or not.

Figure 4:
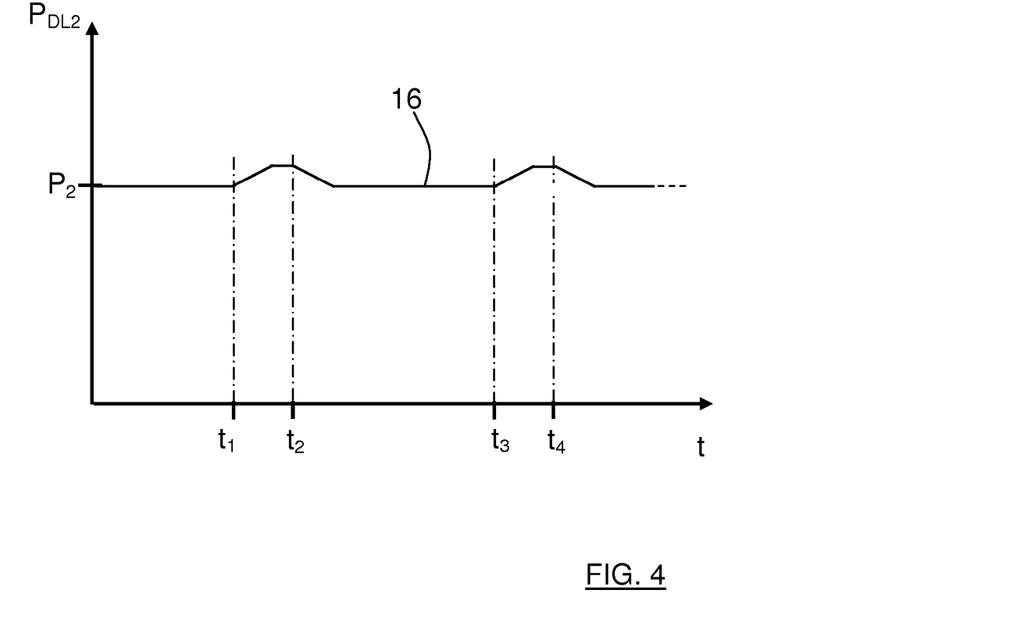
FIG. 4 shows how downlink power transmitted from a second antenna unit to the user terminal varies over time in the first example.
Figure 5:
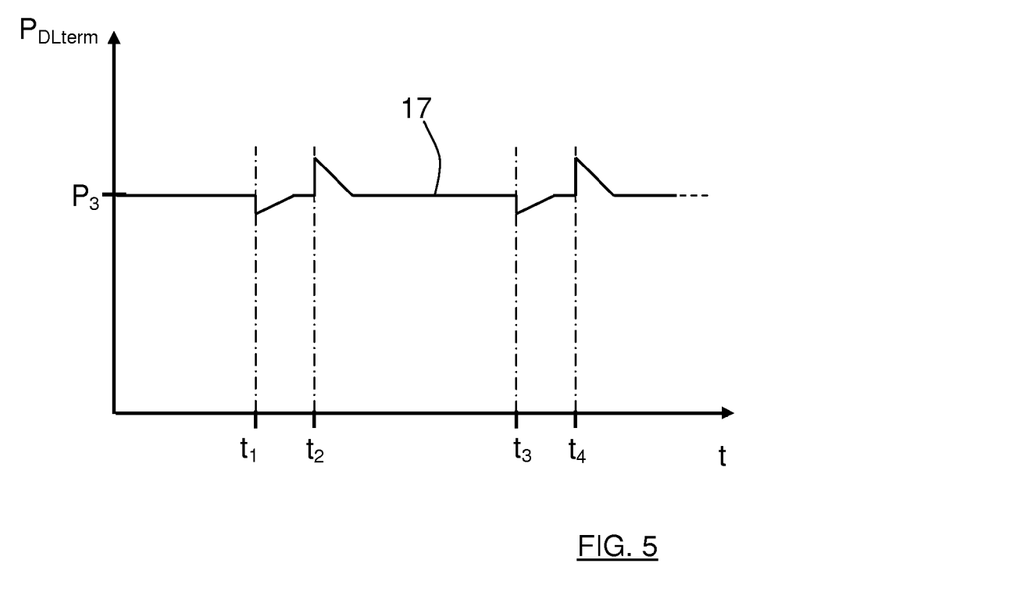
FIG. 5 shows how received downlink power varies over time at a user terminal 9 in the first example.

This is illustrated in FIG. 3, FIG. 4, FIG. 5 and FIG. 6; these Figures and how they are related will be described in the following. FIG. 3 shows how downlink power 15 transmitted from the first antenna unit 2 to the user terminal 9 via the dedicated channel varies over time. FIG. 4 shows how downlink power 16 transmitted from the second antenna unit 3 to the user terminal 9 via the dedicated channel varies over time. FIG. 5 shows how received downlink power 17 via the dedicated channel varies over time at the user terminal 9. FIG. 6 shows how the TPC commands 10 vary over time.

In FIG. 3, the first antenna unit 2 transmits power 15 towards the user terminal 9 with a first power $P_1$ until a first time $t_1$ where the power 15 is muted until a second time $t_2$ where the power 15 is resumed again, first at a higher level, as will explained later, and then back to the first power $P_1$.

In FIG. 5, this is reflected at the received power 17 that initially drops from a third power $P_3$ at the user terminal 9 at the first time $t_1$, but is increased in response to the TPC commands 10 in FIG. 6 that takes the value +1 until the received power 17 at the user terminal 9 reaches the third power $P_3$ again, due to an increase of transmitted power 16 at the second antenna unit 3 towards the user terminal 9 as illustrated in FIG. 4. This occurs before the second time $t_2$, and then the TPC commands 10 in FIG. 6 resumes toggling between +1 and −1 which results in that the transmitted power 16 at the second antenna unit 3 towards the user terminal 9 as illustrated in FIG. 4 levels out at a slightly higher level than an initial second power $P_2$.

At the second time $t_2$, when the power 15 at the first antenna unit 2 is resumed again towards the user terminal 9, the power increase that has been initiated by the TPC commands is in effect at the first antenna unit 2 as well, as is evident from FIG. 3. As a consequence of this, the received power 17 at the user terminal 9 suddenly rises past the third power $P_3$, but is decreased in response to the TPC commands 10 in FIG. 6 that takes the value −1 until the received power 17 at the user terminal 9 reaches the third power $P_3$ again, due to a decrease of transmitted power 15, 16 at the first antenna unit 2 and the second antenna unit 3 towards the user terminal 9 as illustrated in FIG. 3 and FIG. 4. When the received power 17 at the user terminal 9 reaches the third power $P_3$, the TPC commands 10 in FIG. 6 resume toggling between +1 and −1.

Since the received power 17 at the user terminal 9 in this case is relatively quickly restored to the third power $P_3$ at the user terminal when the first power $P_1$ is muted at the first time $t_1$, the control unit 8 will determine that the first antenna unit 2 should stop communicating with the user terminal 9, the second antenna unit 3 being sufficient in this case. Should the second antenna unit 3 have experienced problems restoring the third power $P_3$ at the user terminal when the first power $P_1$ is muted at the first time $t_1$, the control unit 8 will determine that the first antenna unit 2 should continue communicating with the user terminal 9. In other words, the impact of discontinuing communication via a certain radio link is detected in this example. How an impact is defined may of course vary dependent on many different factors; for example the first antenna unit's communication with the user terminal 9 should continue as long as it is possible to detect any kind of impact in the TPC commands when muting.

Furthermore, precautions may have to be taken to avoid removing too much power such that the user terminal 9 does not experience unnecessary problems; for example by using preconditions that shall be fulfilled before doing the probing. Alternatively, the probing could start with removing only a part of the signal between the first time $t_1$ and the second time $t_2$ and if no impact in the TPC commands 10 is detected, the next step is to mute the signal more or less completely.

The control unit 8 is thus arranged to control said first antenna unit 2 to continue communicating with the user terminal 9 in the same way as before the alteration if the results of the monitored inner power control loop 10 fulfil certain criteria, otherwise stop communicating with the user terminal 9. Such criteria may for example comprise whether the inner control loop commands 10 take a certain value at least a predetermined number of times during a certain time period. Other indications may also be taken into account; for example measured UL power behaviour in the antenna units 2, 3.

At a third time $t_3$ and a fourth time $t_4$, this procedure, the probing, is repeated, and at further coming times (not shown). This probing procedure may then be repeated periodically.

Generally, the probing procedure can be continuously performed for all DL radio links, i.e. coverage areas where a radio unit is transmitting to a user terminal, where a periodic repetition is kept running. But it can also be triggered while certain preconditions are fulfilled.

Examples of such preconditions can be one or a combination of the following:

1) A ratio of measured UL power between the first coverage area 5 and the second coverage area 6 falls below a predefined threshold that takes the ratio between the CPICH in the coverage areas 5, 6 into account. In this example, this indicates that the terminal is closer to the second antenna unit 3 than the first antenna unit 2 relative to CPICH.

2) The DL power in the used dedicated channel is decreasing, indicating that the user terminal 9 experiences an increasing DL signal, and the ratio of measured UL power between the coverage areas 5, 6 is decreasing.

Figure 7:
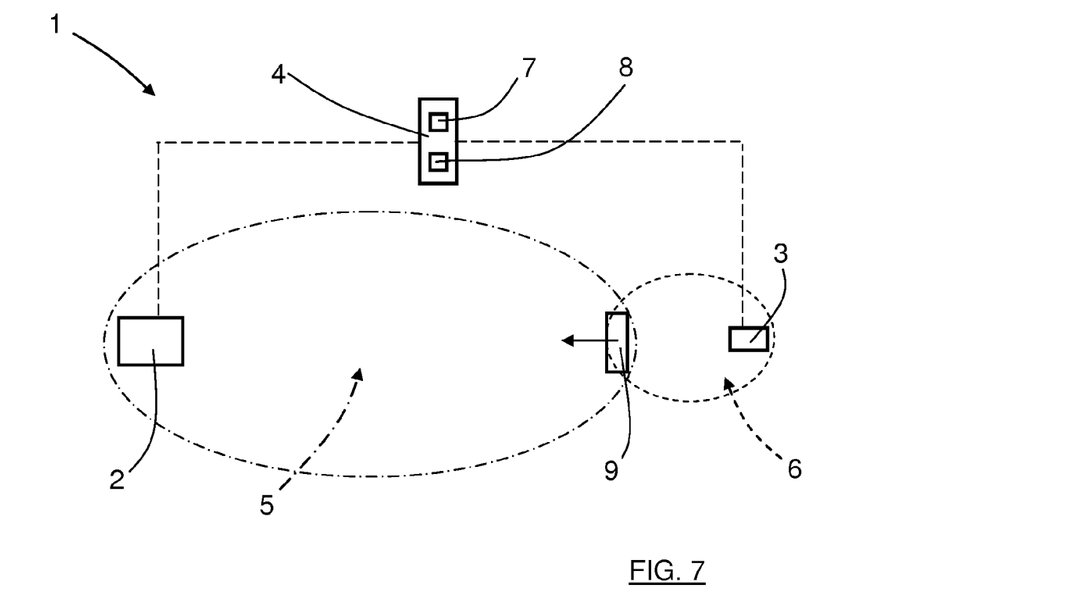
FIG. 7 shows a schematic top view of a second example of a communication node arrangement.
Figure 8:
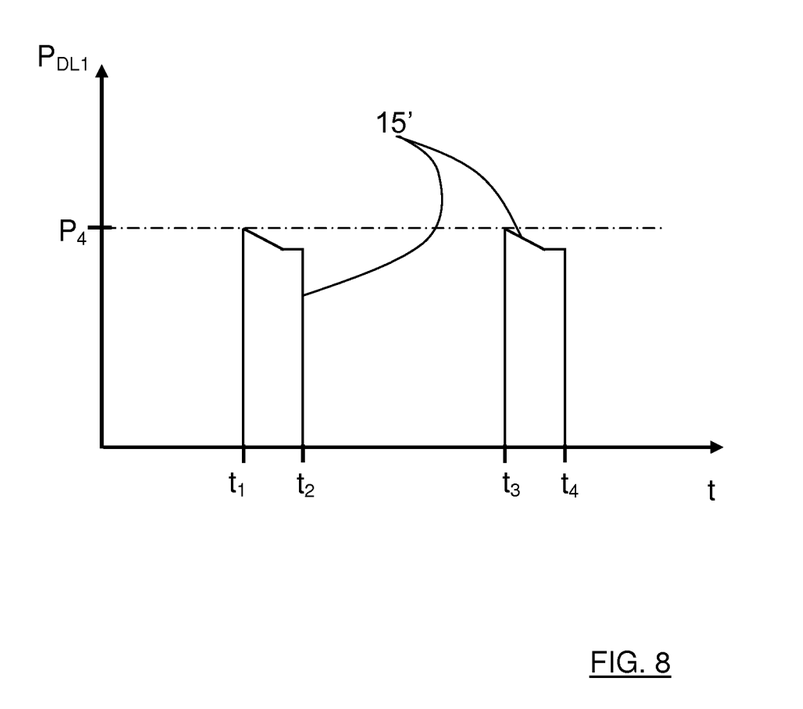
FIG. 8 shows how downlink power transmitted from a first antenna unit to a user terminal varies over time in the second example.

With reference to FIG. 7, showing a second example, only the second antenna unit 3 is communicating with the user terminal 9, and the user terminal 9 is moving from the second coverage area 6 to the first coverage area 5. Here, the control unit 8 is arranged to alter transmitting properties of first antenna unit 2 to the user terminal 9 via the dedicated channel such that more power is transmitted as shown in FIG. 8, the transmitted power towards the user terminal 9 being shut-off before the alteration. Then it is determined to which degree this alteration of transmitting properties has affected the communication for the user terminal 9.

For this purpose, the control unit 8 is again arranged to monitor the TPC commands 10' in FIG. 11 and to determine whether the first antenna unit 2 should start communicating with the user terminal 9, based on how the result of the monitored TPC commands 10 responds to the transmitting properties alteration.

Figure 9:
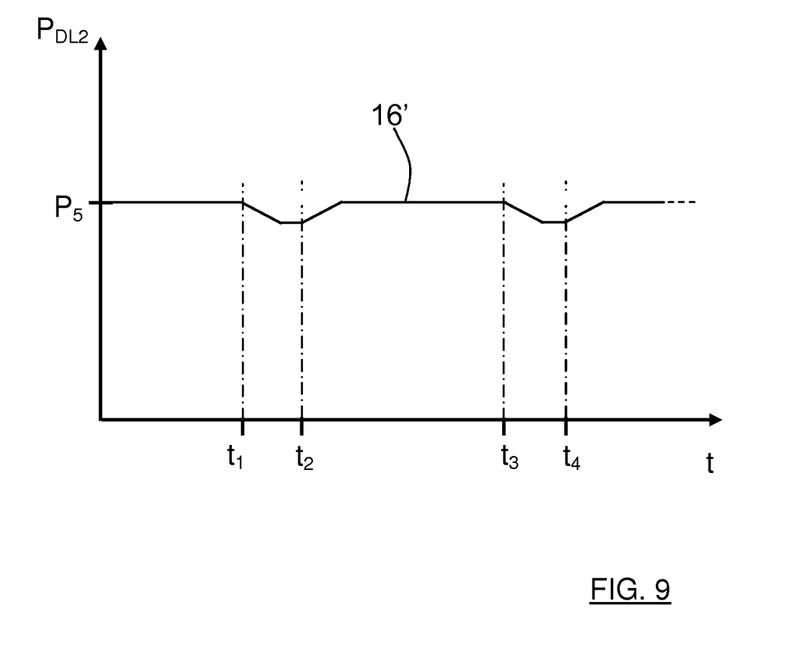
FIG. 9 shows how downlink power transmitted from a second antenna unit to the user terminal varies over time in the second example.
Figure 10:
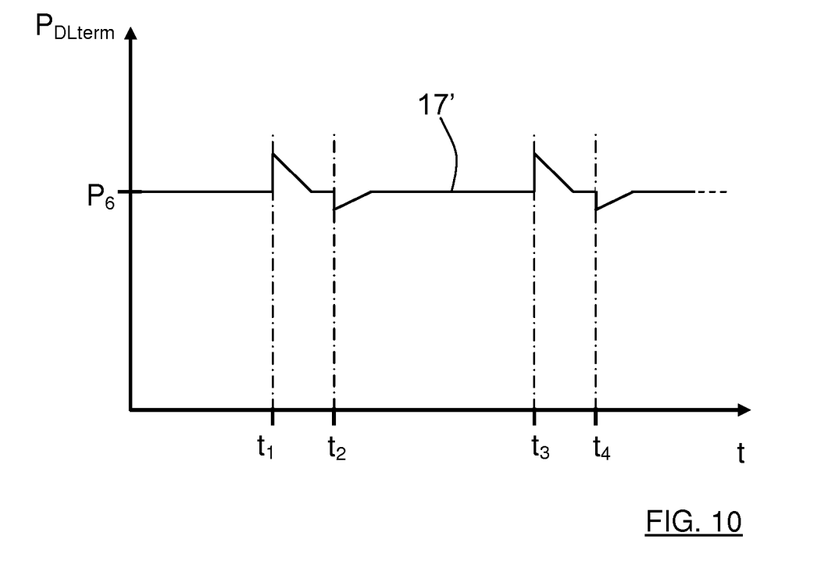
FIG. 10 shows how received downlink power varies over time at a user terminal 9 in the second example.

Generally, the control unit 8 is arranged to control said first antenna unit 2 to alter its transmitting properties by inserting consecutive periods where power is transmitted towards the user terminal 9, and a more detailed example will now be described with reference to FIG. 8, FIG. 9, FIG. 10 and FIG. 11; these Figures and how they are related will be described in the following. FIG. 8 shows how downlink power 15' transmitted from the first antenna unit 2 to the user terminal 9 via the dedicated channel varies over time. FIG. 9 shows how downlink power 16' transmitted from the second antenna unit 3 to the user terminal 9 via the dedicated channel varies over time. FIG. 10 shows how received downlink power 17' via the dedicated channel varies over time at the user terminal 9. FIG. 11 shows how the TPC commands 10' vary over time.

In FIG. 8, the first antenna unit 2 does not transmit any power towards the user terminal 9 until a first time $t_1$ where power 15' is transmitted; initially with a fourth power $P_4$, until a second time $t_2$ where the transmission of power is discontinued. While transmitting, the power 15' initially starts at the fourth power $P_4$ and decreases until it finally levels out before the second time $t_2$, as will be explained later.

In FIG. 10, this is reflected at the received power 17' that initially increases from an initial sixth power $P_6$ at the user terminal 9 at the first time $t_1$, but is decreased in response to the TPC commands 10' in FIG. 11 that takes the value (−1) until the received power 17' at the user terminal 9 reaches the sixth power $P_6$ again, due to a decrease of transmitted power 16' at the second antenna unit 3 towards the user terminal 9 as illustrated in FIG. 9.

This occurs before the second time $t_2$, and then the TPC commands 10' in FIG. 11 resumes toggling between +1 and −1 which results in that the transmitted power 16' at the second antenna unit 3 towards the user terminal 9 as illustrated in FIG. 9 levels out at a slightly lower level than an initial fifth power $P_5$. The same decrease and levelling out of power 15' is apparent for the fourth power $P_4$ between the first time $t_1$ and the second time $t_2$ due to the TPC commands 10', as is evident from FIG. 8.

At the second time $t_2$, first antenna unit 2 stops transmitting power 15' towards the user terminal 9 via the dedicated channel, and as a consequence of this, the received power 17' at the user terminal 9 suddenly decreases from the sixth power $P_6$, but is increased in response to the TPC commands 10' in FIG. 11 that takes the value 1 until the received power 17' at the user terminal 9 reaches the sixth power $P_6$ again, due to an increase of transmitted power 16' at the second antenna unit 3 towards the user terminal 9 as illustrated in FIG. 9. When the received power 17' at the user terminal 9 reaches the sixth power $P_6$, the TPC commands 10' in FIG. 11 resume toggling between +1 and −1.

Since the received power 17' at the user terminal 9 in this case is determined to not benefit from the power 15' transmitted from the first antenna unit 2, the control unit 8 will determine that the first antenna unit 2 should not start communicating with the user terminal 9, the second antenna unit 3 still being sufficient in this case. Eventually, the first antenna unit 2 should start communicating with the user terminal 9 since the user terminal 9 is moving from the second coverage area 6 into the first coverage area, the second antenna unit 3 then not being sufficient for providing service to the user terminal 9. In correspondence with the first example, it may of course vary how an impact is defined dependent on many different factors; for example the first antenna unit's communication with the user terminal 9 should start when it is possible to detect any kind of impact in the TPC commands when power is transmitted by the first antenna unit 2 after shut-off as shown in FIG. 8.

Furthermore, the power addition that is transmitted by the first antenna unit 2 after shut-off as shown in FIG. 8 may be limited such that the user terminal 9 does nor experience unnecessary problems when the power is shut-off again, for example at the second time $t_2$. This shall not be the case if preconditions to start probing have been defined with sufficient margins. Otherwise a ramping sequence is possible or, alternatively to not remove the added power abruptly.

The control unit 8 is thus arranged to control said first antenna unit 2 to start communicating with the user terminal 9 if the results of the monitored inner power control loop 10' fulfil certain criteria, otherwise not start communicating with the user terminal 9. Such criteria may for example be of the same kind as described for the first example.

At a third time $t_3$ and a fourth time $t_4$, this procedure, probing, is repeated, and at further coming times (not shown) this probing procedure may be repeated periodically.

Generally, the probing procedure can be continuously performed for all DL radio links, i.e. coverage areas where a radio unit is not transmitting to a user terminal, where a periodic repetition is kept running. But it can also be triggered while certain preconditions are fulfilled.

Examples of such preconditions can be one or a combination of the following:

1) An UL is detected in cell portion A and the ratio of measured UL power between the first coverage area 5 and the second coverage area 6 exceeds a predefined threshold that takes the ratio between the CPICH in the coverage areas 5, 6 into account.

2) The DL power in the used dedicated channel in the second coverage area 6 is increasing and exceeds a predefined threshold. Find suitable neighbouring coverage area for the present probing procedure described above; in the above example the first coverage area 5.

Generally, such preconditions may comprise that a ratio of measured UL, uplink, power from the user terminal 9 between the first coverage area 5 and the second coverage area 6 deviates beyond a predefined threshold, alternatively that DL power transmitted in at least one coverage area 5, 6 via the dedicated channel deviates beyond a predefined threshold.

The state of a cell portion (communicating/not-communicating) is generally a consequence of earlier decisions that have been taken. When a user terminal is connected to the combined cell according to the above, it is possible to detect in which antenna coverage areas it is received and then this information may be used to decide which antenna units that should be set up for initial communication and which antenna units that should be muted.

The control unit 8 is arranged to monitor the received inner power control loop 10, and this may be performed in many ways. For example by being configured to:

observe a control value of the inner power control loop over time, and to search for one or more pre-determined patterns in this control value over time; and/or  correlate one or more pre-determined patterns against a time series of control values of the inner power control loop; and/or  filter a time series of control values of the inner power control loop to suppress a distortion in the time series.

The TPC commands 10, 10' has been shown to toggle evenly between +1 and −1, and the user terminal's received DL power at the dedicated channel has then been shown to be at a desired level. Furthermore, the values +1 and −1 have been shown to be taken continuously, and the user terminal's received DL power has then been shown to fall below or exceed a desired level, respectively. This is of course an ideal model; in practice there may be a more mixed result where, however, the statistic outcome is more or less the same as for the ideal models shown where the predominant part of the commands is +1 or −1. The reason for this is that the user terminal's experienced received DL power at the dedicated channel varies due to multipath, fading and other interfering effects, but over time the results will be more or less according to the ideal models.

Furthermore, in practice, the TPC commands 10, 10' will suitably have more periods between the first time $t_1$ and the second time $t_2$ then shown, allowing a more reliable statistic outcome to be acquired. The same is of course the case for the third time $t_3$ and the fourth time $t_4$.

Generally, the TPC commands 10, 10' are in the form of inner power control loop commands 10, 10'.

All the FIGS. 3-6 and 8-11 are made to allow an easy understanding of the present disclosure; other curve shapes are of course conceivable. For example, the transmit power alterations may be less abrupt as discussed previously, having more rounded or ramped features, for example allowing the user terminal's AGC (Automatic Gain Control) to better cope with these power alterations.

Figure 12:
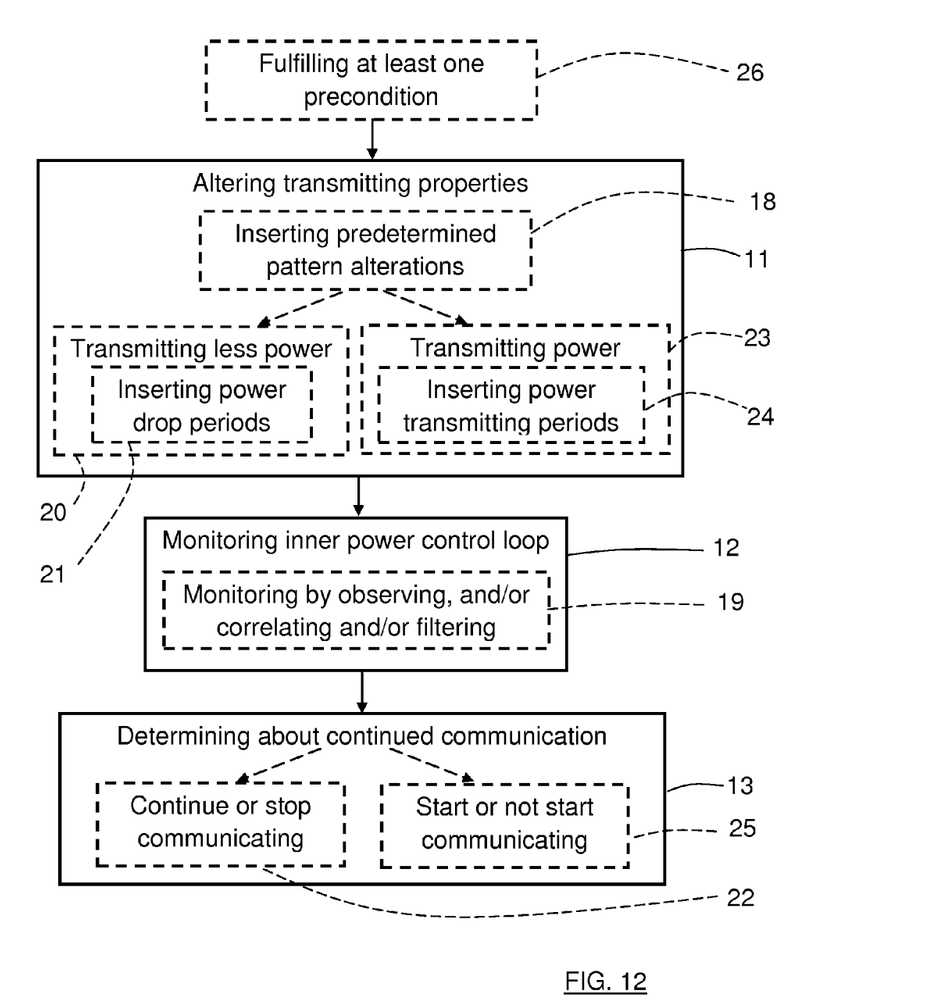
FIG. 12 shows a flowchart illustrating methods for determining relative positions and relative orientations between at least two antenna units in a communication node arrangement.

With reference to FIG. 12, the present disclosure also relates to a method for controlling transmitted power to a user terminal 9 in a CDMA (Code Division Multiple Access) communication system, wherein the method comprises the steps:

11: Altering transmitting properties of at least a first antenna unit 2 to a user terminal 9 such that either more or less power is transmitted by the first antenna unit 2 in a dedicated channel by inserting transmit power alterations. The dedicated channel is used for an inner power control loop commands 10, 10'.

12: Monitoring a received inner power control loop commands 10, 10'.

13: Determining whether said first antenna unit 2 should start or stop communicating with the user terminal 9, or continue as before, based on how the result of the monitored inner power control loop commands 10, 10' responds to said transmitting properties alterations.

In the following, options for the method of the present disclosure will be presented and are illustrated with dashed lines in FIG. 12.

18: According to an example, the method may comprise altering the transmitting properties of said first antenna unit 2 by inserting transmit power alterations according to a pre-determined pattern of power alterations.

19: According to an example, the method may comprise monitoring the received inner power control loop commands 10, by:
  observing a control value of the inner power control loop over time, and to search for one or more pre-determined patterns in this control value over time; and/or
  correlating one or more pre-determined patterns against a time series of control values of the inner power control loop; and/or
  filtering a time series of control values of the inner power control loop to suppress a distortion in the time series.

20: According to an example, the method may comprise altering the transmitting properties of said first antenna unit 2 to the user terminal 9 such that less power 15 is transmitted to the user terminal 9 than before the alteration.

21: According to an example, the method may comprise altering the transmitting properties of said first antenna unit 2 by inserting consecutive power drop periods towards the user terminal 9 during communication with the user terminal 9.

22: According to an example, the method may comprise continue communicating with the user terminal 9 via said first antenna unit 2 in the same way as before the alteration if the results of the monitored inner power control loop commands 10 fulfil certain criteria, otherwise stop communicating with the user terminal 9.

23: According to an example, the method may comprise altering the transmitting properties of said first antenna unit 2 to the user terminal 9 such that power 15' is transmitted to the user terminal 9, the transmitted power towards the user terminal 9 being shut-off before the alteration.

24: According to an example, the method may comprise altering the transmitting properties of said first antenna unit 2 by inserting consecutive periods where power 15' is transmitted towards the user terminal (9).

25: According to an example, the method may comprise starting to communicate with the user terminal if the result of the monitored inner power control loop commands fulfils certain criteria, otherwise not starting to communicate with the user terminal.

26: According to an example, the method may comprise altering the transmitting properties of said first antenna unit 2 to the user terminal 9 when said second antenna unit 3 is communicating with the user terminal 9, and when at least one certain precondition is fulfilled.

The present disclosure is not limited to the above example, but may vary freely within the scoop of the appended claims. For example, each antenna unit may comprise any type of suitable antenna arrangement such as one or more linear array antennas or one or more two-dimensional array antennas. Other types of antennas such as omni-directional antennas or similar is also conceivable.

In the TPC inner loop, the user terminal 9 may be arranged to measure the received SIR (Signal to Interference Ratio) and compare this value against a SIR-TARGET to generate the TPC control commands.

The communication node arrangement 1 may comprise more antenna units than the two antenna units described, and each antenna unit may be arranged to have more than one coverage area each. However, there should be at least two spatially separated antenna units 2, 3 where each antenna unit 2, 3 has at least one corresponding coverage area 5, 6.

The communication node arrangement 1 has been described to comprise a central unit 4 which in turn comprises a radio unit 7 and a control unit. Generally, the communication node arrangement 1 comprises at least one radio unit 7 and at least one central unit 4, where said central unit 4 comprises a control unit 8. This means that there may be more than one radio unit, and no radio unit has to be positioned in a central unit. For example, one or more radio units may be placed in one ore more central units and/or one or more radio units may be in the form of a distributed radio unit that is comprised in a corresponding antenna unit.

Although not mandatory, the control unit 8 may be arranged to control an antenna unit 2 to alter its transmitting properties by inserting transmit power alterations according to a pre-determined pattern of power alterations. During each occasion where the power is altered, a sequence of power changes may be done to enhance statistics. Such a sequence may comprise a burst of alterations, each alteration taking place between two times, such as between the first time $t_1$ and the second time $t_2$; and the third time $t_3$ and the fourth time $t_4$, where a number of such bursts is repeated a number of times in order to obtain a sufficient statistic base for forming a decision regarding whether starting or stopping communication as discussed previously. A basic example of such a burst of alterations has been given previously for the first example, where the alterations starts with a limited power decrease, in the example 3 dB, and if sufficient impact is not detected at the TPC commands, complete muting is tried in a following power alteration.

The probing procedure may comprise a sequence of power alterations which are monitored, and after a sufficient number of alterations have been performed in order to obtain a sufficient statistic base, a decision is taken regarding whether communication should take place or not.

The examples presented relate to a W-CDMA system, but may apply for any kind of CDMA system.

Generally, the present disclosure relates to a CDMA (Code Division Multiple Access) communication node arrangement 1 comprising at least two spatially separated antenna units 2, 3, at least one radio unit 7 and at least one central unit 4. Each antenna unit 2, 3 has at least one corresponding coverage area 5, 6 and is connected to said central unit 4, where the coverage areas 5, 6 form a combined cell. The central unit 4 comprises a control unit 8, wherein the control unit 8 is arranged to alter transmitting properties of at least a first antenna unit 2, having at least a first coverage area 5, to a user terminal 9, such that either more or less power is transmitted by the first antenna unit 2 in a dedicated channel by inserting transmit power alterations. The dedicated channel is arranged for inner power control loop commands 10, 10'. The control unit 8 is arranged to monitor received inner power control loop commands 10, 10' when at least a second antenna unit 3 having at least a second coverage area 6 is communicating with the user terminal 9, and to determine whether said first antenna unit 2 should start or stop communicating with the user terminal 9, or continue as before, based on how the result of the monitored inner power control loop commands 10, 10' responds to said transmitting properties alterations.

According to an example, the control unit 8 is arranged to control said first antenna unit 2 to alter its transmitting properties by inserting transmit power alterations according to a pre-determined pattern of power alterations.

According to another example, the control unit 8 is arranged to monitor the received inner power control loop commands 10 by being configured to:
 observe a control value of the inner power control loop over time, and to search for one or more pre-determined patterns in this control value over time; and/or
 correlate one or more pre-determined patterns against a time series of control values of the inner power control loop; and/or
 filter a time series of control values of the inner power control loop to suppress a distortion in the time series.

According to another example, the inner power control loop commands 10, 10' are in the form of TPC, Transmit Power Control, commands.

According to another example, the user terminal 9 is arranged to measure received power 17, 17' at the dedicated channel.

According to another example, the control unit 8 is arranged to control said first antenna unit 2 to alter its transmitting properties to the user terminal 9 such that less power 15 is transmitted to the user terminal 9 than before the alteration.

According to another example, the control unit 8 is arranged to control said first antenna unit 2 to alter its transmitting properties by inserting consecutive power drop periods towards the user terminal 9 during communication with the user terminal 9.

According to another example, the control unit 8 is arranged to control said first antenna unit 2 to continue communicating with the user terminal 9 in the same way as before the alteration if the results of the monitored inner power control loop commands 10 fulfil certain criteria, otherwise stop communicating with the user terminal 9.

According to another example, said certain criteria comprises whether the inner control loop commands 10 take a certain value at least a predetermined number of times during a certain time period.

According to another example, the control unit 8 is arranged to control said first antenna unit 2 to alter its transmitting properties to the user terminal 9 such that power 15' is transmitted to the user terminal 9, the transmitted power towards the user terminal 9 being shut-off before the alteration.

According to another example, the control unit 8 is arranged to control said first antenna unit 2 to alter its transmitting properties by inserting consecutive periods where power 15' is transmitted towards the user terminal 9.

According to another example, the control unit 8 is arranged to control said first antenna unit 2 to start communicating with the user terminal 9 if the results of the monitored inner power control loop commands 10' fulfil certain criteria, otherwise not start communicating with the user terminal 9.

According to another example, said certain criteria comprises whether the inner control loop commands 10' take a certain value at least a predetermined number of times during a certain time period.

According to another example, the control unit 8 is arranged to control said first antenna unit 2 to alter its transmitting properties to the user terminal when said second antenna unit 3 is communicating with the user terminal 9, and when at least one certain precondition is fulfilled.

According to another example, a precondition is that a ratio of measured UL, uplink, power from the user terminal 9 between the first coverage area 5 and the second coverage area 6 deviates beyond a predefined threshold.

According to another example, a precondition is that the DL power 15, 16; 15', 16' transmitted in at least one coverage area 5, 6 via the dedicated channel deviates beyond a predefined threshold.

Generally, the present disclosure also relates to a method for controlling transmitted power to a user terminal 9 in a CDMA (Code Division Multiple Access) communication system, wherein the method comprises the steps:
 11: altering transmitting properties of at least a first antenna unit 2 to a user terminal 9 such that either more or less power is transmitted by the first antenna unit 2 in a dedicated channel by inserting transmit power alterations, where the dedicated channel is used for inner power control loop commands 10, 10';
 12: monitoring received inner power control loop commands 10, 10'; and
 13: determining whether said first antenna unit 2 should start or stop communicating with the user terminal 9, or continue as before, based on how the result of the monitored inner power control loop commands 10, 10' responds to said transmitting properties alterations.

According to an example, the method comprises altering the transmitting properties of said first antenna unit 2 by inserting transmit power alterations according to a pre-determined pattern of power alterations.

According to another example, the method comprises monitoring the received inner power control loop commands 10 by:
- observing a control value of the inner power control loop over time, and to search for one or more pre-determined patterns in this control value over time; and/or
- correlating one or more pre-determined patterns against a time series of control values of the inner power control loop; and/or
- filtering a time series of control values of the inner power control loop to suppress a distortion in the time series.

According to another example, the inner power control loop commands 10, 10' are in the form of a TPC, Transmit Power Control, commands.

According to another example, the dedicated channel is used for measuring received power 17, 17' at the user terminal 9.

According to another example, the method comprises altering the transmitting properties of said first antenna unit 2 to the user terminal 9 such that less power 15 is transmitted to the user terminal 9 than before the alteration.

According to another example, the method comprises altering the transmitting properties of said first antenna unit 2 by inserting consecutive power drop periods towards the user terminal 9 during communication with the user terminal 9.

According to another example, the method comprises continue communicating with the user terminal 9 vial said first antenna unit 2 in the same way as before the alteration if the results of the monitored inner power control loop commands 10 fulfil certain criteria, otherwise stop communicating with the user terminal 9.

According to another example, wherein said certain criteria comprises whether the inner control loop commands 10 take a certain value at least a predetermined number of times during a certain time period.

According to another example, the method comprises altering the transmitting properties of said first antenna unit 2 to the user terminal 9 such that power 15' is transmitted to the user terminal 9, the transmitted power towards the user terminal 9 being shut-off before the alteration.

According to another example, the method comprises altering the transmitting properties of said first antenna unit 2 by inserting consecutive periods where power 15' is transmitted towards the user terminal 9.

According to another example, the method comprises starting to communicate with the user terminal 9 if the results of the monitored inner power control loop commands 10' fulfil certain criteria, otherwise not starting to communicate with the user terminal 9.

According to another example, said certain criteria comprises whether the inner control loop commands 10' take a certain value at least a predetermined number of times during a certain time period.

According to another example, the method comprises altering the transmitting properties of said first antenna unit 2 to the user terminal 9 when said second antenna unit 3 is communicating with the user terminal 9, and when at least one certain precondition is fulfilled.

According to another example, a precondition is that a ratio of measured UL, uplink, power from the user terminal 9 between the first coverage area 5 and the second coverage area 6 deviates beyond a predefined threshold.

According to another example, a precondition is that the DL power 15, 16; 15', 16' transmitted in at least one coverage area 5, 6 via the dedicated channel deviates beyond a predefined threshold.

Figure 13:
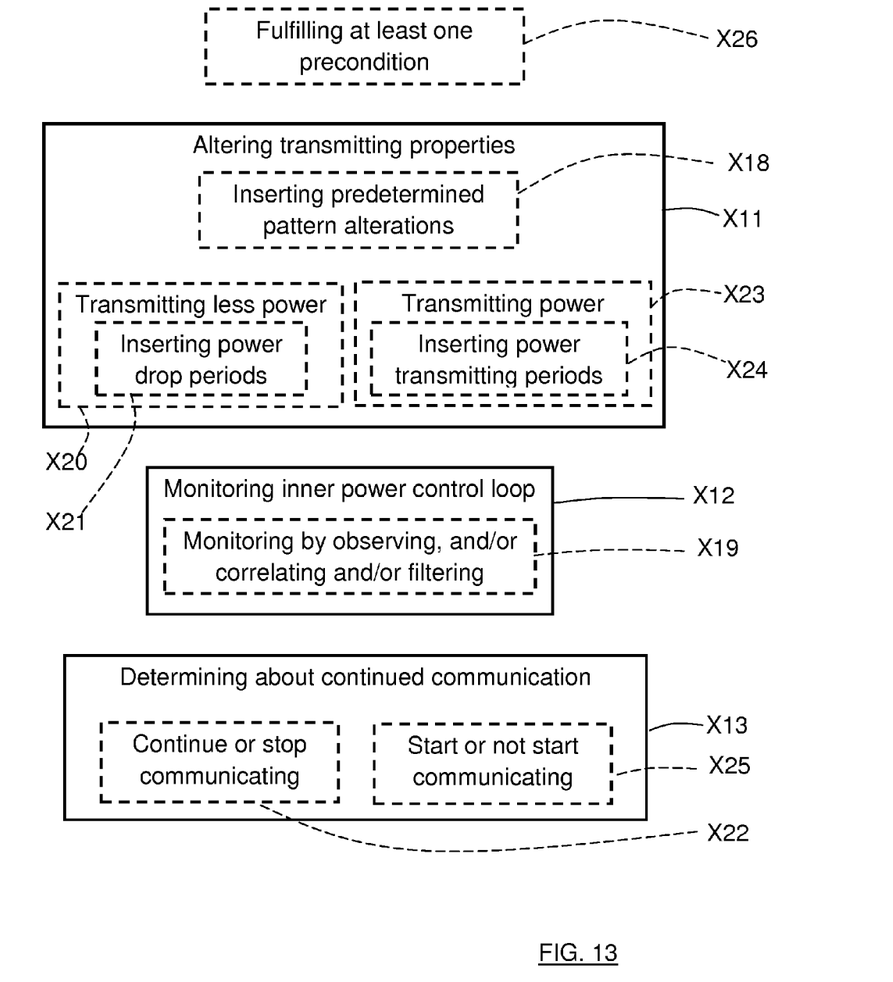
FIG. 13 illustrates a communication node arrangement according to some aspects of the present disclosure.

FIG. 13 shows a communication node arrangement for controlling transmitted power to a user terminal 9 in a CDMA, Code Division Multiple Access, communication system. The communication node arrangement comprises:
- An altering module X11 configured to alter transmitting properties of at least a first antenna unit 2 to a user terminal 9 such that either more or less power is transmitted by the first antenna unit 2 in a dedicated channel by inserting transmit power alterations, where the dedicated channel is used for inner power control loop commands 10, 10';
- A monitoring module X12 configured to monitor received inner power control loop commands 10, 10'; and
- A determining module X13 configured to determine whether said first antenna unit 2 should start or stop communicating with the user terminal 9, or continue as before, based on how the result of the monitored inner power control loop commands 10, 10' responds to said transmitting properties alterations.

According to some aspects, the communication node arrangement further comprises an optional inserting module X18 configured to insert transmit power alterations according to a pre-determined pattern of power alterations.

According to some aspects, the communication node arrangement further comprises an optional monitoring module X19 configured to monitor the received inner power control loop commands 10, by:
- observing a control value of the inner power control loop over time, and to search for one or more pre-determined patterns in this control value over time; and/or
- correlating one or more pre-determined patterns against a time series of control values of the inner power control loop; and/or
- filtering a time series of control values of the inner power control loop to suppress a distortion in the time series.

According to some aspects, the communication node arrangement further comprises an optional first altering module X20 configured to alter the transmitting properties of said first antenna unit 2 to the user terminal 9 such that less power 15 is transmitted to the user terminal 9 than before the alteration.

According to some aspects, the communication node arrangement further comprises an optional power drop module X21 configured to alter the transmitting properties of said first antenna unit 2 by inserting consecutive power drop periods towards the user terminal 9 during communication with the user terminal 9.

According to some aspects, the communication node arrangement further comprises an optional first communication module X22 configured to continue communicating with the user terminal 9 via said first antenna unit 2 in the same way as before the alteration if the results of the monitored inner power control loop commands 10 fulfil certain criteria, otherwise stop communicating with the user terminal 9.

According to some aspects, the communication node arrangement further comprises an optional second altering module X23 configured to alter the transmitting properties of said first antenna unit 2 to the user terminal 9 such that power 15' is transmitted to the user terminal 9, the transmitted power towards the user terminal 9 being shut-off before the alteration.

According to some aspects, the communication node arrangement further comprises an optional power transmit module X24 configured to alter the transmitting properties of said first antenna unit 2 by inserting consecutive periods where power 15' is transmitted towards the user terminal 9.

According to some aspects, the communication node arrangement further comprises an optional second communication module X25 configured to starting to communicate with the user terminal if the result of the monitored inner power control loop commands fulfils certain criteria, otherwise not starting to communicate with the user terminal.

According to some aspects, the communication node arrangement further comprises an optional precondition module X26 configured to alter the transmitting properties of said first antenna unit 2 to the user terminal 9 when said second antenna unit 3 is communicating with the user terminal 9, and when at least one certain precondition is fulfilled.

The invention claimed is:

1. A Code Division Multiple Access (CDMA) communication node arrangement comprising:
    at least two spatially separated antenna units;
    at least one radio unit; and
    at least one central unit;
    wherein each antenna unit has at least one corresponding coverage area and is connected to the central unit;
    wherein the coverage areas form a combined cell;
    wherein the central unit comprises a control circuit;
        wherein the control circuit is configured to alter transmitting properties of at least a first antenna unit, having at least a first coverage area, to a user terminal, such that either more or less power is transmitted by the first antenna unit in a dedicated channel by inserting transmit power alterations;
    wherein the dedicated channel is configured for inner power control loop commands;
    wherein the control circuit is configured to:
        monitor received inner power control loop commands when at least a second antenna unit having at least a second coverage area is communicating with the user terminal; and
        determine whether the first antenna unit should start or stop communicating with the user terminal, or continue as before, based on how a result of the monitored inner power control loop commands responds to the transmitting properties alterations.

2. The CDMA communication node arrangement of claim 1, wherein the control circuit is configured to control the first antenna unit to alter its transmitting properties by inserting transmit power alterations according to a predetermined pattern of power alterations.

3. The CDMA communication node arrangement of claim 1, wherein the control circuit is configured to monitor the received inner power control loop commands by being configured to do one or more of the following:
    observe a control value of the inner power control loop over time, and to search for one or more predetermined patterns in this control value over time;
    correlate one or more predetermined patterns against a time series of control values of the inner power control loop;
    filter a time series of control values of the inner power control loop to suppress a distortion in the time series.

4. The CDMA communication node arrangement of claim 1, wherein the inner power control loop commands are in the form of Transmit Power Control commands.

5. The CDMA communication node arrangement of claim 1, wherein the user terminal is configured to measure received power at the dedicated channel.

6. The CDMA communication node arrangement of claim 1, wherein the control circuit is configured to control the first antenna unit to alter its transmitting properties to the user terminal such that less power is transmitted to the user terminal than before the alteration.

7. The CDMA communication node arrangement of claim 6, wherein the control circuit is configured to control the first antenna unit to alter its transmitting properties by inserting consecutive power drop periods towards the user terminal during communication with the user terminal.

8. The CDMA communication node arrangement of claim 6, wherein the control circuit is configured to control the first antenna unit to continue communicating with the user terminal in the same way as before the alteration if the results of the monitored inner power control loop commands fulfil certain criteria, otherwise stop communicating with the user terminal.

9. The CDMA communication node arrangement of claim 8, wherein the certain criteria comprises whether the inner control loop commands take a certain value at least a predetermined number of times during a certain time period.

10. The CDMA communication node arrangement of claim 1, wherein the control circuit is configured to control the first antenna unit to alter its transmitting properties to the user terminal such that power is transmitted to the user terminal, the transmitted power towards the user terminal being shut-off before the alteration.

11. The CDMA communication node arrangement of claim 10, wherein the control circuit is configured to control the first antenna unit to alter its transmitting properties by inserting consecutive periods where power is transmitted towards the user terminal.

12. The CDMA communication node arrangement of claim 10, wherein the control circuit is configured to control the first antenna unit to start communicating with the user terminal if the results of the monitored inner power control loop commands fulfil certain criteria, otherwise not start communicating with the user terminal.

13. The CDMA communication node arrangement of claim 12, wherein the certain criteria comprises whether the inner control loop commands take a certain value at least a predetermined number of times during a certain time period.

14. The CDMA communication node arrangement of claim 1, wherein the control circuit is configured to control the first antenna unit to alter its transmitting properties to the user terminal when the second antenna unit is communicating with the user terminal, and when at least one certain precondition is fulfilled.

15. The CDMA communication node arrangement of claim 14, wherein the precondition is that a ratio of measured uplink power from the user terminal between the first coverage area and the second coverage area deviates beyond a predefined threshold.

16. The CDMA communication node arrangement of claim 14, wherein the precondition is that the downlink power transmitted in at least one coverage area via the dedicated channel deviates beyond a predefined threshold.

17. A method for controlling transmitted power to a user terminal in a Code Division Multiple Access (CDMA) communication system, the method comprising:
    altering transmitting properties of at least a first antenna unit to a user terminal such that either more or less power is transmitted by the first antenna unit in a dedicated channel by inserting transmit power alterations, where the dedicated channel is used for inner power control loop commands;

monitoring received inner power control loop commands when at least a second antenna unit is communicating with the user terminal, wherein each antenna unit has at least one corresponding coverage area, wherein the coverage areas form a combined cell; and determining whether the first antenna unit should start or stop communicating with the user terminal, or continue as before, based on how a result of the monitored inner power control loop commands responds to the transmitting properties alterations.

18. The method of claim 17, wherein the altering the transmitting properties of the first antenna unit comprises altering the transmitting properties of the first antenna unit by inserting transmit power alterations according to a predetermined pattern of power alterations.

19. The method of claim 17, wherein the monitoring the received inner power control loop commands comprises at least one of:
observing a control value of the inner power control loop over time, and to search for one or more predetermined patterns in this control value over time;
correlating one or more predetermined patterns against a time series of control values of the inner power control loop;
filtering a time series of control values of the inner power control loop to suppress a distortion in the time series.

20. The method of claim 17, wherein the inner power control loop commands are in the form of a Transmit Power Control, commands.

21. The method of claim 17, wherein the dedicated channel is used for measuring received power at the user terminal.

22. The method of claim 17, wherein the method comprises altering the transmitting properties of the first antenna unit to the user terminal such that less power is transmitted to the user terminal than before the alteration.

23. The method of claim 22, wherein the method comprises altering the transmitting properties of the first antenna unit by inserting consecutive power drop periods towards the user terminal during communication with the user terminal.

24. The method of claim 22, wherein the method comprises continuing to communicate with the user terminal via the first antenna unit in the same way as before the alteration if the result of the monitored inner power control loop commands fulfils certain criteria, otherwise stopping communication with the user terminal.

25. The method of claim 24, wherein the certain criteria comprises whether the inner control loop commands take a certain value at least a predetermined number of times during a certain time period.

26. The method of claim 17, wherein the method comprises altering the transmitting properties of the first antenna unit to the user terminal such that power is transmitted to the user terminal, the transmitted power towards the user terminal being shut-off before the alteration.

27. The method of claim 26, wherein the method comprises altering the transmitting properties of the first antenna unit by inserting consecutive periods where power is transmitted towards the user terminal.

28. The method of claim 26, wherein the method comprises starting to communicate with the user terminal if the result of the monitored inner power control loop commands fulfils certain criteria, otherwise not starting to communicate with the user terminal.

29. The method of claim 28, wherein the certain criteria comprises whether the inner control loop commands take a certain value at least a predetermined number of times during a certain time period.

30. The method of claim 17, wherein the method comprises altering the transmitting properties of the first antenna unit to the user terminal when the second antenna unit is communicating with the user terminal, and when at least one certain precondition is fulfilled.

31. The method of claim 30:
wherein the first antenna unit has at least a first coverage area;
wherein the second antenna unit has at least a second coverage area;
wherein the precondition is that a ratio of measured uplink power from the user terminal between the first coverage area and the second coverage area deviates beyond a predefined threshold.

32. The method of claim 30, wherein a precondition is that downlink DL power transmitted in at least one coverage area via the dedicated channel deviates beyond a predefined threshold.

* * * * *

UNITED STATES PATENT AND TRADEMARK OFFICE
CERTIFICATE OF CORRECTION

PATENT NO. : 10,154,462 B2
APPLICATION NO. : 15/519710
DATED : December 11, 2018
INVENTOR(S) : Bentland et al.

Page 1 of 1

It is certified that error appears in the above-identified patent and that said Letters Patent is hereby corrected as shown below:

In the Specification

In Column 8, Line 9, delete "does nor" and insert -- does not --, therefor.

In Column 10, Line 58, delete "one ore" and insert -- one or --, therefor.

In the Claims

In Column 15, Line 62, in Claim 3, delete "loop;" and insert -- loop; and --, therefor.

Signed and Sealed this
Ninth Day of April, 2019

Andrei Iancu
*Director of the United States Patent and Trademark Office*